US012644394B2

(12) United States Patent
Seyler et al.

(10) Patent No.: US 12,644,394 B2
(45) Date of Patent: Jun. 2, 2026

(54) HYDRAULICALLY DRIVEN DE-OILER FOR GAS TURBINE ENGINES

(71) Applicant: RTX Corporation, Farmington, CT (US)

(72) Inventors: Joshua Robert Seyler, Stuart, FL (US); Ryan Andrew Mitchell, Jupiter, FL (US); Austin Finley, Hobe Sound, FL (US)

(73) Assignee: RTX Corporation, Farmington, CT (US)

( * ) Notice: Subject to any disclaimer, the term of this patent is extended or adjusted under 35 U.S.C. 154(b) by 43 days.

(21) Appl. No.: 18/741,070

(22) Filed: Jun. 12, 2024

(65) Prior Publication Data

US 2025/0382896 A1 Dec. 18, 2025

(51) Int. Cl.
*F01D 25/20* (2006.01)

(52) U.S. Cl.
CPC .......... *F01D 25/20* (2013.01); *F05D 2250/25* (2013.01); *F05D 2260/609* (2013.01); *F05D 2260/98* (2013.01)

(58) Field of Classification Search
CPC ........... F15D 2260/98; F15D 2260/609; F15D 2250/25
See application file for complete search history.

(56) References Cited

U.S. PATENT DOCUMENTS 2,705,053 A * 3/1955 Morris .................. F16N 39/002 210/512.1
3,349,548 A * 10/1967 Boyen ..................... B04C 5/103 210/512.1
4,559,068 A * 12/1985 Lagerstedt ............. B01D 45/12 55/459.1
6,709,476 B2 * 3/2004 Kitano ...................... B04C 5/14 55/423
7,867,310 B2 * 1/2011 Baten ........................ B04C 5/12 55/455
11,255,265 B2 * 2/2022 Gebhard ................ B01D 45/14
11,660,610 B2 * 5/2023 Birk .......................... B04B 9/06 55/401
12,253,001 B2 * 3/2025 Radon ...................... F01D 25/20
2010/0187180 A1 * 7/2010 Baten ..................... B01D 45/08 60/39.08
2012/0234174 A1 * 9/2012 Rollins .............. B01D 19/0057 96/220

(Continued)

*Primary Examiner* — Michael A Riegelman
(74) *Attorney, Agent, or Firm* — Bachman & LaPointe, P.C.

(57) ABSTRACT

A hydraulically driven de-oiler for gas turbine engines including a lubricant pumping section operatively coupled with a fuel impelling section, the lubricant pumping section and the fuel impelling section being divided by a lubricant to fuel divider; a helical sinus formed within the lubricant pumping section, the helical sinus configured to pump at least one of lubricant, and lubricant mist from a de-oiler tank inlet to a de-oiler tank outlet and configured to pump the air to a de-oiler air vent outlet in the absence of lubricant; and the fuel impelling section fluidly coupled with a fuel inlet and a fuel outlet, the fuel impelling section comprising impellers configured to receive a fluid flow of fuel and translate a flow energy from the fluid flow into a mechanical rotational energy and impart the mechanical rotational energy into the de-oiler.

17 Claims, 5 Drawing Sheets

(56) References Cited

U.S. PATENT DOCUMENTS

| | | | | |
|---|---|---|---|---|
| 2018/0119617 | A1* | 5/2018 | Pulter | B01D 19/0057 |
| 2021/0156515 | A1* | 5/2021 | Schetzel | F02C 7/06 |
| 2024/0175376 | A1* | 5/2024 | Radon | F01D 25/20 |

* cited by examiner

HYDRAULICALLY DRIVEN DE-OILER FOR GAS TURBINE ENGINES

BACKGROUND

The present disclosure is directed to the improved hydraulically driven de-oiler for gas turbine engines.

In gas turbine engine applications, a gearbox or oil tanks must be vented through an air breather port as a result of operational and atmospheric conditions. The gas turbine system uses bleed air to create differential pressure across lubrication seals (Labyrinth, Carbon, etc.) to keep the oil from escaping the lubrication (lube) system.

The leakage of bleed air across the seals, the thermal effects of the lubrication system heating up, and altitude conditions all contribute to the need to accommodate for airflow through the gearbox or oil tank and out the breather port.

A fine mist is created during operation to efficiently lubricate and cool critical rotating hardware which will not condense sufficiently prior to escaping through the breather port. There are several negative impacts from oil escaping including environmental and oil consumption issues. To minimize the escape of oil through the breather tube, an air/oil separator, also called a de-oiler is used.

A de-oiler is a rotating mechanical device which centrifugally separates oil from the breather air prior to discharging the air to the atmosphere. De-oilers require mechanical input to function, historically, being driven by a gearbox. In applications where no gearbox is present, there is nothing readily available to drive the de-oiler.

SUMMARY

In accordance with the present disclosure, there is provided a hydraulically driven de-oiler for gas turbine engines comprising a lubricant pumping section operatively coupled with a fuel turbine impelling section, the lubricant pumping section and the fuel turbine impelling section being divided by a lubricant to fuel divider; a helical sinus formed within the lubricant pumping section, the helical sinus configured to pump at least one of lubricant, and lubricant mist from a de-oiler tank inlet to a de-oiler tank outlet and configured to pump the air to a de-oiler air vent outlet in the absence of lubricant; and the fuel turbine impelling section fluidly coupled with a fuel inlet and a fuel outlet, the fuel turbine impelling section comprising impellers configured to receive a fluid flow of fuel and translate a flow energy from the fluid flow into a mechanical rotational energy and impart the mechanical rotational energy into the de-oiler.

A further embodiment of any of the foregoing embodiments may additionally and/or alternatively include the helical sinus comprises lubricant impellers, the lubricant impellers being formed as contiguous helix shaped paddles that define a continuous flow passage with discrete pockets serially aligned along an axis of the de-oiler.

A further embodiment of any of the foregoing embodiments may additionally and/or alternatively include the lubricant impellers are configured to rotate and impart mechanical rotary and axial motion to the lubricant mist and air to pump the lubricant mist and air through the de-oiler.

A further embodiment of any of the foregoing embodiments may additionally and/or alternatively include the lubricant impellers are configured to impart centrifugal forces into the lubricant mist and air causing the lubricant to separate from the air.

A further embodiment of any of the foregoing embodiments may additionally and/or alternatively include the lubricant to fuel divider is configured to transfer thermal energy from the lubricant pumping section to the fuel turbine impelling section such that the lubricant warms the fuel passing through the de-oiler.

A further embodiment of any of the foregoing embodiments may additionally and/or alternatively include the fuel turbine impelling section being located radially outboard from the lubricant pumping section relative to the axis of the de-oiler, the fuel turbine impelling section being located between an exterior wall and the lubricant to fuel divider of the de-oiler.

A further embodiment of any of the foregoing embodiments may additionally and/or alternatively include the hydraulically driven de-oiler for gas turbine engines further comprising a modified lubricant pumping section, the modified lubricant pumping section includes a perforated divider, the perforated divider configured to separate the modified lubricant pumping section into a radially inner region and a radially outer region.

In accordance with the present disclosure, there is provided a de-oiler system for a gas turbine engine comprising a lubrication system tank configured to contain lubricant, the lubricant fluidly coupled with at least one of the gas turbine engine, rotating hardware and bearings through a lubricant supply line; a de-oiler operatively coupled with the lubrication system tank; the de-oiler comprising a lubricant pumping section operatively coupled with a fuel turbine impelling section, the lubricant pumping section and the fuel turbine impelling section being divided by a lubricant to fuel divider; a helical sinus formed within the lubricant pumping section, the helical sinus configured to pump at least one of the lubricant, and a lubricant mist from a de-oiler tank inlet fluidly coupled with the lubrication system tank to a de-oiler tank outlet fluidly coupled with the lubrication system tank and configured to pump the air to a de-oiler air vent outlet in the absence of lubricant; and the fuel turbine impelling section fluidly coupled with a fuel inlet and a fuel outlet, the fuel turbine impelling section comprising impellers configured to receive a fluid flow of fuel and translate a flow energy from the fluid flow into a mechanical rotational energy and impart the mechanical rotational energy into the de-oiler.

A further embodiment of any of the foregoing embodiments may additionally and/or alternatively include the helical sinus comprises lubricant impellers, the lubricant impellers being formed as contiguous helix shaped paddles that define a continuous flow passage with discrete pockets serially aligned along an axis of the de-oiler, wherein the lubricant impellers are configured to rotate and impart mechanical rotary and axial motion to the lubricant mist and air to pump the lubricant mist and air through the de-oiler, wherein the lubricant impellers are configured to impart centrifugal forces into the lubricant mist and air causing the lubricant to separate from the air.

A further embodiment of any of the foregoing embodiments may additionally and/or alternatively include the lubricant to fuel divider is configured to transfer thermal energy from the lubricant pumping section to the fuel turbine impelling section, such that the lubricant warms the fuel passing through the de-oiler.

A further embodiment of any of the foregoing embodiments may additionally and/or alternatively include the fuel turbine impelling section being located radially outboard from the lubricant pumping section relative to the axis of the de-oiler, the fuel turbine impelling section being located between an exterior wall and the lubricant to fuel divider of the de-oiler.

A further embodiment of any of the foregoing embodiments may additionally and/or alternatively include the de-oiler system for a gas turbine engine further comprising a perforated divider located in the lubricant pumping section, the perforated divider configured to separate the lubricant pumping section into a radially inner region and a radially outer region.

A further embodiment of any of the foregoing embodiments may additionally and/or alternatively include the de-oiler system for a gas turbine engine further comprising perforations formed in the perforated divider, the perforations configured for fluid communication between the radially inner region and the radially outer region.

In accordance with the present disclosure, there is provided a process for separating lubricant with a de-oiler system for a gas turbine engine comprising containing a lubricant within a lubrication system tank; fluidly coupling the lubricant with at least one of the gas turbine engine, rotating hardware and bearings through a lubricant supply line; operatively coupling a de-oiler with the lubrication system tank; operatively coupling a lubricant pumping section of the de-oiler with a fuel turbine impelling section of the de-oiler; separating the lubricant pumping section from the fuel turbine impelling section with a lubricant to fuel divider; forming a helical sinus within the lubricant pumping section; configuring the helical sinus to pump at least one of the lubricant, and a lubricant mist from a de-oiler tank inlet fluidly coupled with the lubrication system tank to a de-oiler tank outlet fluidly coupled with the lubrication system tank; configuring the helical sinus to pump the air to a de-oiler air vent outlet in the absence of lubricant; and fluidly coupling the fuel turbine impelling section with a fuel inlet and a fuel outlet, the fuel turbine impelling section comprising impellers; and configuring the impellers to receive a fluid flow of fuel and translate a flow energy from the fluid flow into a mechanical rotational energy and impart the mechanical rotational energy into the de-oiler.

A further embodiment of any of the foregoing embodiments may additionally and/or alternatively include the helical sinus comprises lubricant impellers; forming the lubricant impellers as contiguous helix shaped paddles that define a continuous flow passage with discrete pockets serially aligned along an axis of the de-oiler; configuring the lubricant impellers to impart mechanical rotary and axial motion to the lubricant mist and air to pump the lubricant mist and air through the de-oiler.

A further embodiment of any of the foregoing embodiments may additionally and/or alternatively include the process further comprising configuring the lubricant impellers to impart centrifugal forces into the lubricant mist and air causing the lubricant to separate from the air.

A further embodiment of any of the foregoing embodiments may additionally and/or alternatively include the process further comprising configuring the lubricant to fuel divider to transfer thermal energy from the lubricant pumping section to the fuel turbine impelling section, such that the lubricant warms the fuel passing through the de-oiler.

A further embodiment of any of the foregoing embodiments may additionally and/or alternatively include the process further comprising locating the fuel turbine impelling section radially outboard from the lubricant pumping section relative to the axis of the de-oiler; and locating the fuel turbine impelling section between an exterior wall and the lubricant to fuel divider of the de-oiler.

A further embodiment of any of the foregoing embodiments may additionally and/or alternatively include the process further comprising forming a perforated divider within the lubricant pumping section; configuring the perforated divider to separate the lubricant pumping section into a radially inner region and a radially outer region.

A further embodiment of any of the foregoing embodiments may additionally and/or alternatively include the process further comprising forming perforations in the perforated divider; configuring the perforations for fluid communication between the radially inner region and the radially outer region.

Other details of the hydraulically driven de-oiler for gas turbine engines are set forth in the following detailed description and the accompanying drawings wherein like reference numerals depict like elements.

DETAILED DESCRIPTION

Figure 1:
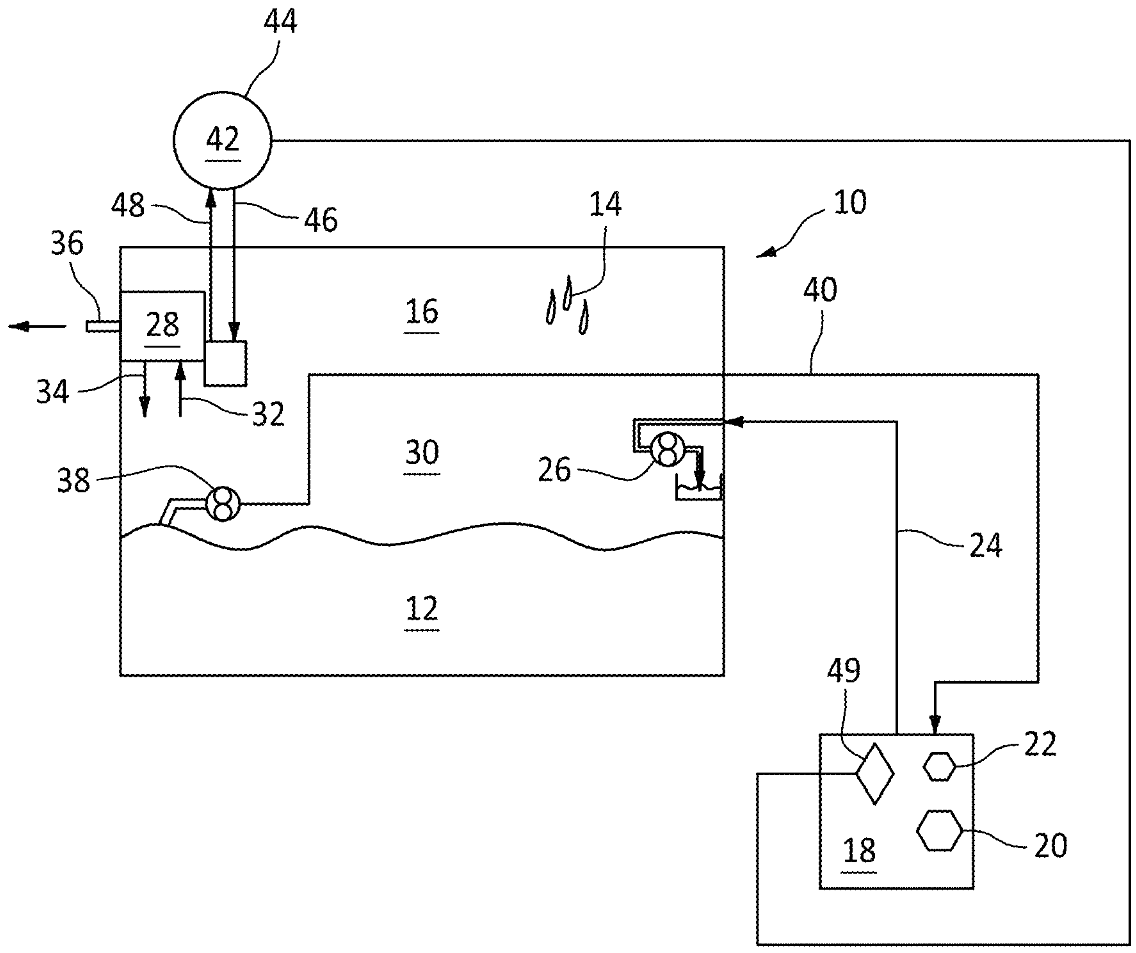
FIG. 1 is a schematic representation of an exemplary lubrication oil tank with exemplary de-oiler.

Referring now to FIG. 1, an exemplary lubrication system tank 10 is shown. The lubrication system tank 10 can include a volume of lubricant 12. The lubricant 12 is shown in liquid form in the tank 10. The tank 10 also includes lubricant mist 14, which includes fine particles of lubricant entrained in air 16 within the tank 10. It is also contemplated that the lubricant mist 14 can be located in other portions of the gas turbine engine 18 and migrate back to the tank 10. The lubricant 12 is used to lubricate rotating hardware 20, such as bearings 22. The lubricant 12 is returned to the tank 10 via return lines 24 propelled by a scavenge pump 26.

Referring also to FIG. 2 to FIG. 5, the tank 10 also includes a de-oiler 28 in fluid communication with the interior 30 of the tank 10. The de-oiler 28 removes a portion of the air 16 and lubricant mist 14 from the interior 30 at a de-oiler tank inlet 32. The de-oiler 28 separates the lubricant 12 from the lubricant mist 14 and/or air 16 and returns the lubricant 12 to the tank 10 through a de-oiler tank outlet 34. The air 16 having been separated from the lubricant 12 can be vented outside of the tank 10 through the de-oiler air vent outlet 36.

A lubricant pump 38 can supply the gas turbine engine 18, rotating hardware 20 and bearings 32 with the lubricant 12 from the tank 10 through lubricant supply line 40.

The de-oiler 28 can be driven by fuel 42 from a fuel supply 44. The fuel 42 can flow from the fuel supply 44 into the de-oiler 28 through a fuel inlet 46 and circulate through the de-oiler 28 exiting a fuel outlet 48. The fuel supply 44 can provide the fuel 42 at a high pressure (e.g., 500 to 600 pounds per square inch gauge) and low flow rate (e.g., 1 to 4 gallons per minute). The fuel 42 can flow through the de-oiler 28 and impart mechanical rotary energy RE into the de-oiler 28. The mechanical rotary energy RE helps to propel the lubricant mist 14 and air 16 through the de-oiler 28.

The fuel 42 can cool the de-oiler 28. The fuel 42 can enter the de-oiler 28 at a temperature below the temperature of the lubricant mist 14 and air 16 flowing through the de-oiler 28. Thermal energy Q can be transferred from the lubricant 12 to the fuel 42 within the de-oiler 28. Cooling the de-oiler 28 with the fuel 42 can help to remove the lubricant 12 from the air 16. There is an advantage of warming the fuel 42 as it travels from the fuel supply 44 ultimately to the combustor section 49.

As seen in FIG. 2 to FIG. 5 the de-oiler 28 includes the de-oiler tank inlet 32 through which the lubricant mist 14 and air 16 are flowed into the de-oiler 28 as a result of pressure differences between the tank 10 interior and tank exterior. The de-oiler 28 includes a lubricant pumping section 50 and a fuel turbine impelling section 52. The lubricant pumping section 50 and fuel turbine impelling section 52 are divided by a lubricant to fuel divider 54. The lubricant to fuel divider 54 prevents fuel 42 from mixing with the lubricant 12 or lubricant mist 14 while allowing for heat transfer between the cooler fuel 42 and warmer lubricant 12.

The de-oiler 28 also includes a helical sinus 56 within the lubricant pumping section 50. The helical sinus 56 operates on a principle similar to an Archimedes' screw pump. The helical sinus 56 includes lubricant impellers 58. The lubricant impellers 58 are formed as contiguous helix shaped paddles that define a continuous flow passage 55 with discrete pockets 57 serially aligned along the axis A. The lubricant impellers 58 are configured to rotate and impart mechanical rotary motion to the lubricant mist 14 and air 16 to pump these fluids through the de-oiler 28. The lubricant impellers 58 also impart centrifugal forces into the lubricant mist 14 and air 16 causing the lubricant 12 to separate from the air 16 and contact the lubricant impellers 58 so that the lubricant 12 can be transported along the de-oiler helical sinus 56 and flow toward the de-oiler tank outlet 34 for return to the lubrication system tank 10. The air 16 having been cleared of lubricant 12 can flow through the helical sinus 56 toward the de-oiler air vent outlet 36.

The fuel turbine impelling section 52 receives the fuel 42 from the fuel inlet 46. The fuel turbine impelling section 52 has impellers 60 that receive the fluid flow of the fuel 42 and translate the flow energy FE into the mechanical rotational energy RE, like a turbine. The cooler fuel 42 can receive thermal energy Q transferred across the lubricant to fuel divider 54 from the warmer lubricant 12. The fuel 42 passes through the fuel turbine impelling section 52 and exits from the fuel outlet 48 to return to the fuel supply 44 system and ultimately supplies fuel 42 to the combustor section 49 within the gas turbine engine 18.

The fuel turbine impelling section 52 is radially outboard from the lubricant pumping section 50 relative to axis A of the de-oiler 28. The fuel turbine impelling section 52 can be located between an exterior wall 62 and the lubricant to fuel divider 54 of the de-oiler 28. In an exemplary embodiment, the exterior wall 62 is the outermost structure of the de-oiler 28.

Figure 2:
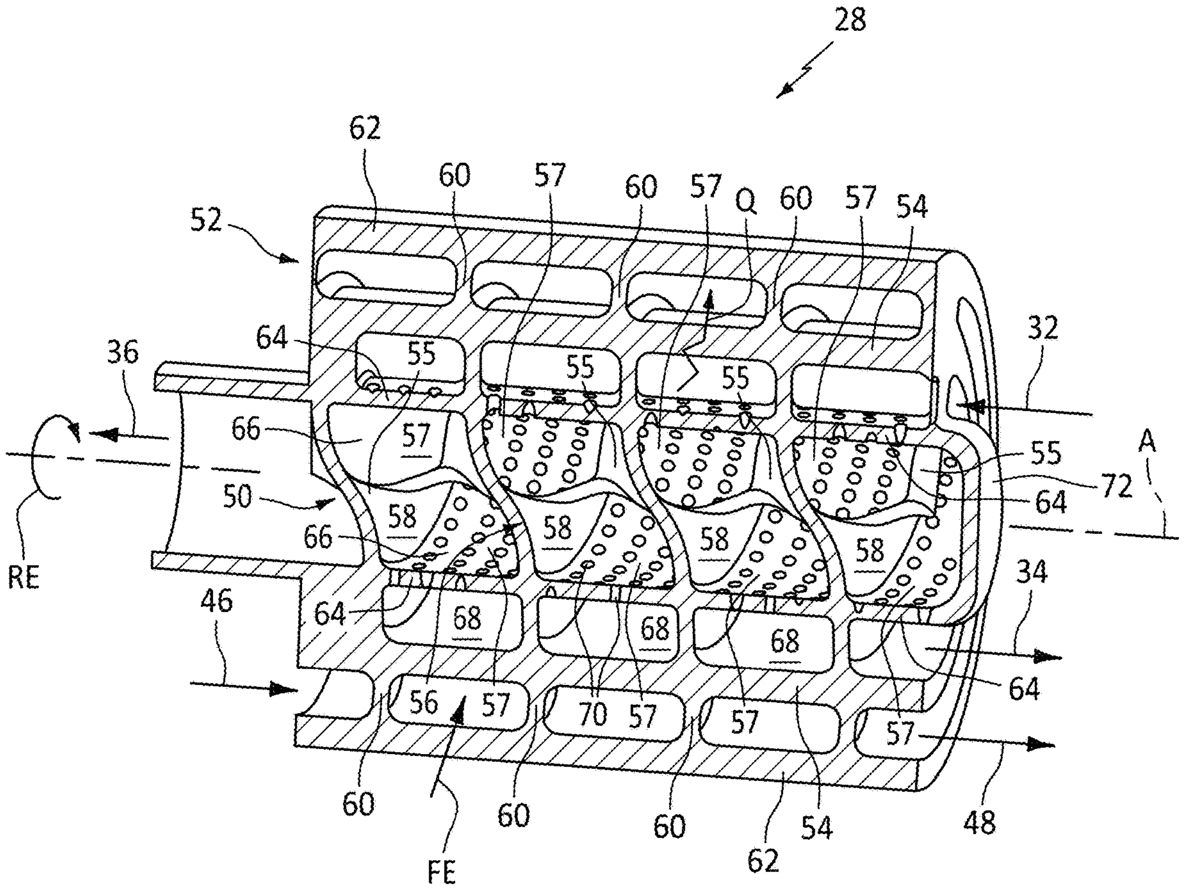
FIG. 2 is a perspective cross-section view schematic representation of an exemplary de-oiler.
Figure 3:
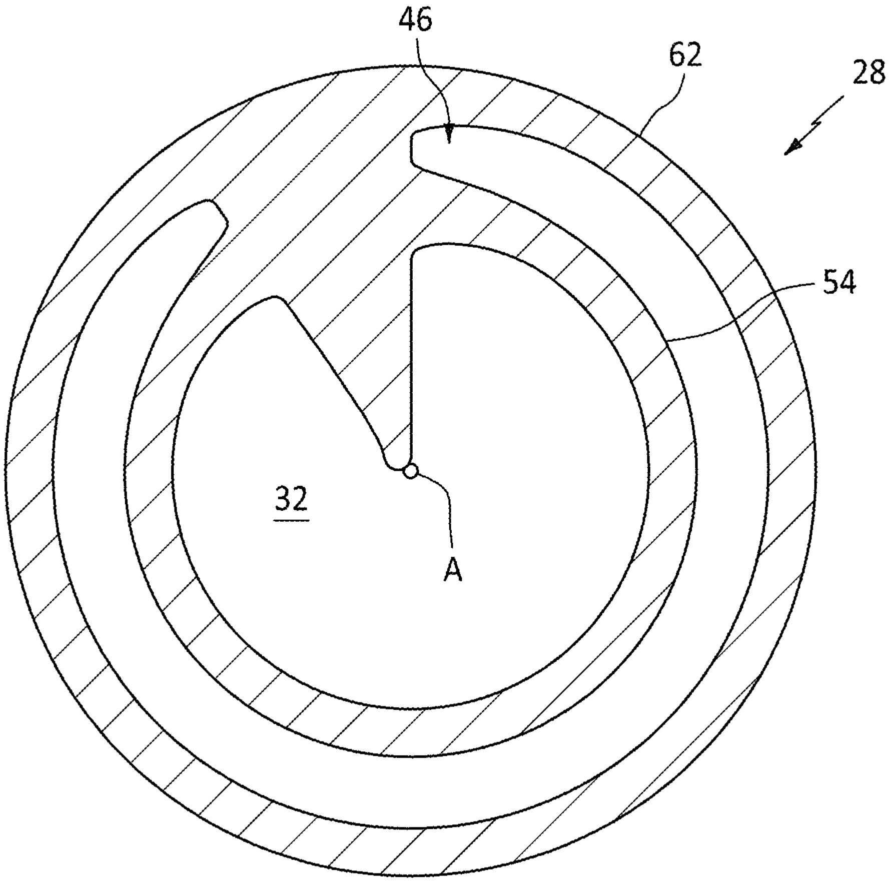
FIG. 3 is an end cross-section view schematic representation of the exemplary de-oiler.
Figure 4:
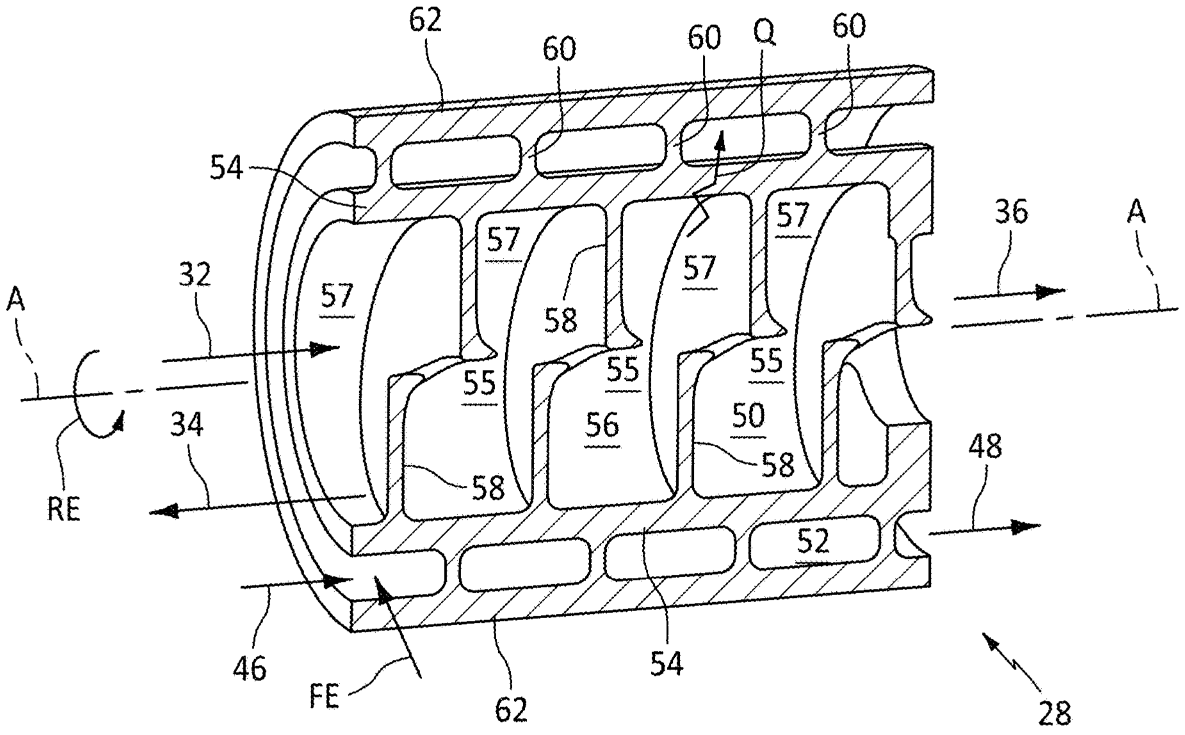
FIG. 4 is a cross-section view schematic representation of the exemplary de-oiler.
Figure 5:
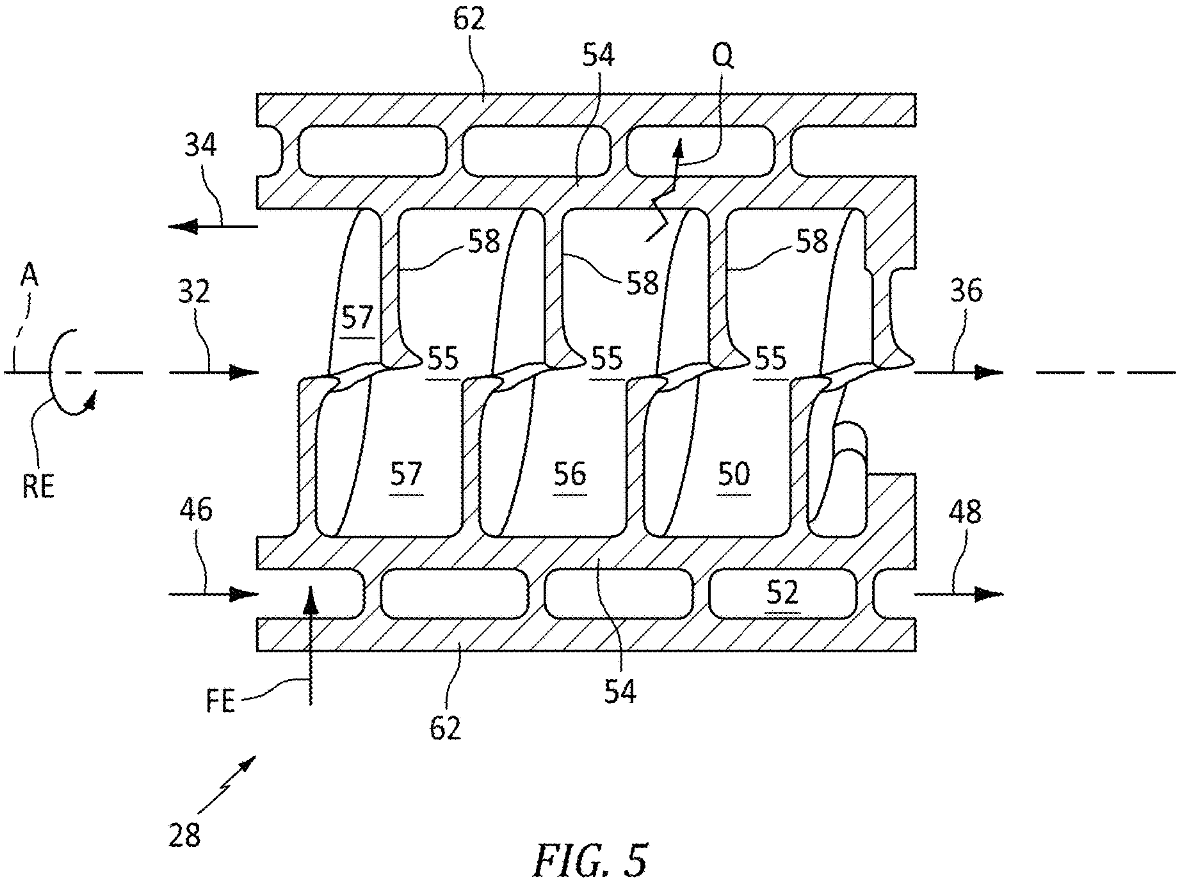
FIG. 5 is a cross-section view schematic representation of the exemplary de-oiler.

In the embodiment shown in FIG. 2, the de-oiler 28 includes a modified lubricant pumping section 52. The lubricant pumping section 52 includes a perforated divider 64. The perforated divider 64 separates the lubricant pumping section 52 into a radially inner region 66 and a radially outer region 68. There are perforations 70 formed throughout the perforated divider 64. The perforations 70 allow for fluid communication between the radially inner region 66 and the radially outer region 68. The lubricant 12 and lubricant mist 14 as well as the air 16 can enter the radially inner region 66 and become centrifugally excited and pass through the perforations 70 into the radially outer region 68. The lubricant 12, lubricant mist 14 and air 16 pass along the lubricant pumping section translating axially and radially as the lubricant 12 separates from the air 16. The radially inner region 66 is shown with an end cap 72 enclosing the radially inner region 66 at an end opposite the de-oiler tank outlet 36.

A technical advantage of the disclosed hydraulically driven de-oiler for gas turbine engines includes a de-oiler which is passively driven when the fuel and/or lubrication systems are active.

Another technical advantage of the disclosed hydraulically driven de-oiler for gas turbine engines includes a system that functions in gas turbine engines that do not have a gearbox to drive accessories such as fuel or lubrication systems.

Another technical advantage of the disclosed hydraulically driven de-oiler for gas turbine engines includes a significant decrease in electrical power demand to drive the pump motors.

Another technical advantage of the disclosed hydraulically driven de-oiler for gas turbine engines includes removing any electrical components that have a high draw on power to help the airframer manage the demand during startup.

Another technical advantage of the disclosed hydraulically driven de-oiler for gas turbine engines includes a small drive mechanism tied into existing plumbing which is ideal and will have a minimal impact to weight.

There has been provided a hydraulically driven de-oiler for gas turbine engines. While the hydraulically driven de-oiler for gas turbine engines has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A hydraulically driven de-oiler for gas turbine engines comprising:

a lubricant pumping section operatively coupled with a fuel turbine impelling section, the lubricant pumping section and the fuel turbine impelling section being divided by a lubricant to fuel divider;

a helical sinus formed within the lubricant pumping section, the helical sinus configured to pump at least one of lubricant, and lubricant mist from a de-oiler tank inlet to a de-oiler tank outlet and configured to pump the air to a de-oiler air vent outlet in the absence of lubricant; and the fuel turbine impelling section fluidly coupled with a fuel inlet and a fuel outlet, the fuel turbine impelling section comprising impellers configured to receive a fluid flow of fuel and translate a flow energy from the fluid flow into a mechanical rotational energy and impart the mechanical rotational energy into the de-oiler; wherein the fuel turbine impelling section is located radially outboard from the lubricant pumping section relative to the axis of the de-oiler, the fuel turbine impelling section is located between an exterior wall and the lubricant to fuel divider of the de-oiler.

2. The hydraulically driven de-oiler for gas turbine engines according to claim 1, wherein the helical sinus comprises lubricant impellers, the lubricant impellers being formed as contiguous helix shaped paddles that define a continuous flow passage with discrete pockets serially aligned along an axis of the de-oiler.

3. The hydraulically driven de-oiler for gas turbine engines according to claim 2, wherein the lubricant impellers are configured to rotate and impart mechanical rotary and axial motion to the lubricant mist and air to pump the lubricant mist and air through the de-oiler.

4. The hydraulically driven de-oiler for gas turbine engines according to claim 2, wherein the lubricant impellers are configured to impart centrifugal forces into the lubricant mist and air causing the lubricant to separate from the air.

5. The hydraulically driven de-oiler for gas turbine engines according to claim 1, wherein the lubricant to fuel divider is configured to transfer thermal energy from the lubricant pumping section to the fuel turbine impelling section such that the lubricant warms the fuel passing through the de-oiler.

6. The hydraulically driven de-oiler for gas turbine engines according to claim 1, further comprising:

a modified lubricant pumping section, the modified lubricant pumping section comprising a perforated divider, the perforated divider configured to separate the modified lubricant pumping section into a radially inner region and a radially outer region.

7. A de-oiler system for a gas turbine engine comprising:

a lubrication system tank configured to contain lubricant, the lubricant fluidly coupled with at least one of the gas turbine engine, rotating hardware and bearings through a lubricant supply line;

a de-oiler operatively coupled with the lubrication system tank; the de-oiler comprising:

a lubricant pumping section operatively coupled with a fuel turbine impelling section, the lubricant pumping section and the fuel turbine impelling section being divided by a lubricant to fuel divider;

a helical sinus formed within the lubricant pumping section, the helical sinus configured to pump at least one of the lubricant, and a lubricant mist from a de-oiler tank inlet fluidly coupled with the lubrication system tank to a de-oiler tank outlet fluidly coupled with the lubrication system tank and configured to pump the air to a de-oiler air vent outlet in the absence of lubricant; and the fuel turbine impelling section fluidly coupled with a fuel inlet and a fuel outlet, the fuel turbine impelling section comprising impellers configured to receive a fluid flow of fuel and translate a flow energy from the fluid flow into a mechanical rotational energy and impart the mechanical rotational energy into the de-oiler; wherein the fuel turbine impelling section is located radially outboard from the lubricant pumping section relative to the axis of the de-oiler, the fuel turbine impelling section is located between an exterior wall and the lubricant to fuel divider of the de-oiler.

8. The de-oiler system for a gas turbine engine according to claim 7, wherein the helical sinus comprises lubricant impellers, the lubricant impellers being formed as contiguous helix shaped paddles that define a continuous flow passage with pockets serially aligned along an axis of the de-oiler, wherein the lubricant impellers are configured to rotate and impart mechanical rotary and axial motion to the lubricant mist and air to pump the lubricant mist and air through the de-oiler, wherein the lubricant impellers are configured to impart centrifugal forces into the lubricant mist and air causing the lubricant to separate from the air.

9. The de-oiler system for a gas turbine engine according to claim 7, wherein the lubricant to fuel divider is configured to transfer thermal energy from the lubricant pumping section to the fuel turbine impelling section, such that the lubricant warms the fuel passing through the de-oiler.

10. The de-oiler system for a gas turbine engine according to claim 7, further comprising:

a perforated divider located in the lubricant pumping section, the perforated divider configured to separate the lubricant pumping section into a radially inner region and a radially outer region.

11. The de-oiler system for a gas turbine engine according to claim 10, further comprising:

perforations formed in the perforated divider, the perforations configured for fluid communication between the radially inner region and the radially outer region.

12. A process for separating lubricant with a de-oiler system for a gas turbine engine comprising:

containing a lubricant within a lubrication system tank;

fluidly coupling the lubricant with at least one of the gas turbine engine, rotating hardware and bearings through a lubricant supply line;

operatively coupling a de-oiler with the lubrication system tank;

operatively coupling a lubricant pumping section of the de-oiler with a fuel turbine impelling section of the de-oiler;

separating the lubricant pumping section from the fuel turbine impelling section with a lubricant to fuel divider;

forming a helical sinus within the lubricant pumping section;

configuring the helical sinus to pump at least one of the lubricant, and a lubricant mist from a de-oiler tank inlet fluidly coupled with the lubrication system tank to a de-oiler tank outlet fluidly coupled with the lubrication system tank;

configuring the helical sinus to pump the air to a de-oiler air vent outlet in the absence of lubricant;

fluidly coupling the fuel turbine impelling section with a fuel inlet and a fuel outlet, the fuel turbine impelling section comprising impellers;

configuring the impellers to receive a fluid flow of fuel and translate a flow energy from the fluid flow into a mechanical rotational energy and impart the mechanical rotational energy into the de-oiler;

locating the fuel turbine impelling section radially outboard from the lubricant pumping section relative to the axis of the de-oiler; and locating the fuel turbine impelling section between an exterior wall and the lubricant to fuel divider of the de-oiler.

13. The process of claim 12, wherein the helical sinus comprises lubricant impellers, and the process further comprises:

forming the lubricant impellers as contiguous helix shaped paddles that define a continuous flow passage with pockets serially aligned along an axis of the de-oiler;

configuring the lubricant impellers to impart mechanical rotary and axial motion to the lubricant mist and air to pump the lubricant mist and air through the de-oiler.

14. The process of claim 13, further comprising:
configuring the lubricant impellers to impart centrifugal forces into the lubricant mist and air causing the lubricant to separate from the air.

15. The process of claim 12, further comprising:
configuring the lubricant to fuel divider to transfer thermal energy from the lubricant pumping section to the fuel impelling section, such that the lubricant warms the fuel passing through the de-oiler.

16. The process of claim 12, further comprising:
forming a perforated divider within the lubricant pumping section;
configuring the perforated divider to separate the lubricant pumping section into a radially inner region and a radially outer region.

17. The process of claim 16, further comprising:
forming perforations in the perforated divider;
configuring the perforations for fluid communication between the radially inner region and the radially outer region.

* * * * *